United States Patent [19]
Tanisawa et al.

[11] Patent Number: 5,278,929
[45] Date of Patent: Jan. 11, 1994

[54] OPTICAL MODULE, METHOD FOR FABRICATING THE SAME AND OPTICAL MODULE UNIT WITH THE SAME

[75] Inventors: Yasuhisa Tanisawa; Tetsuji Ueda, both of Tokyo, Japan

[73] Assignee: NEC Corporation, Tokyo, Japan

[21] Appl. No.: 881,187

[22] Filed: May 11, 1992

[30] Foreign Application Priority Data

May 10, 1991 [JP] Japan .................. 3-105838

[51] Int. Cl.⁵ .................................... G02B 6/36
[52] U.S. Cl. ............................ 385/93; 385/43
[58] Field of Search ........................ 385/88, 385/94, 33, 66, 68, 43

[56] References Cited
U.S. PATENT DOCUMENTS 4,302,070 11/1981 Nakayama et al. .................. 385/88
4,790,617 12/1988 Campbell et al. .................... 385/32
5,011,247 4/1991 Boudreau et al. .................... 385/88

Primary Examiner—Rodney B. Bovernick
Assistant Examiner—John Ngo
Attorney, Agent, or Firm—Sughrue, Mion, Zinn, Macpeak & Seas

[57] ABSTRACT

An optical module comprises a capillary in which first and second optical fibers are connected. The first optical fiber is aligned through a lens to an optical device, and the second optical fiber functions as a pigtail cord connected to an external optical fiber. The first optical fiber is a TEC (thermal expand core) fiber having an end portion whose core diameter is larger than that of the other portion thereof, and the first optical fiber is a normal optical fiber which has a uniform core diameter smaller than the core diameter of the TEC fiber.

10 Claims, 5 Drawing Sheets

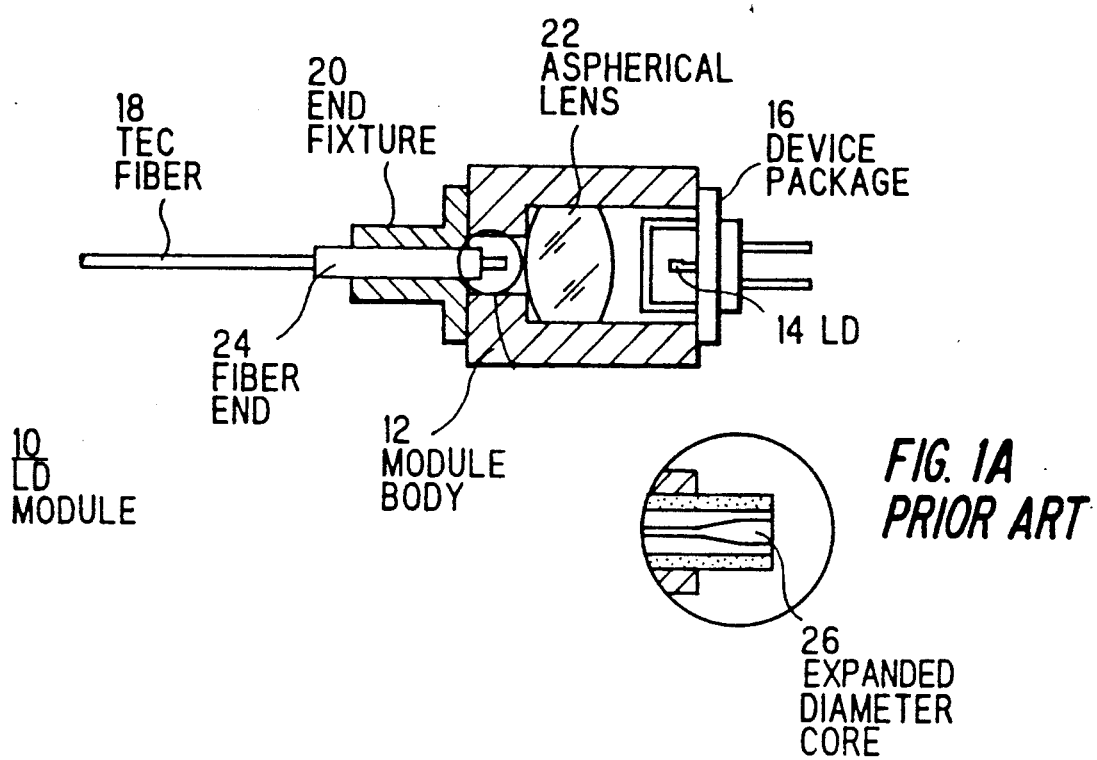
FIG.1 PRIOR ART
FIG. 1A PRIOR ART
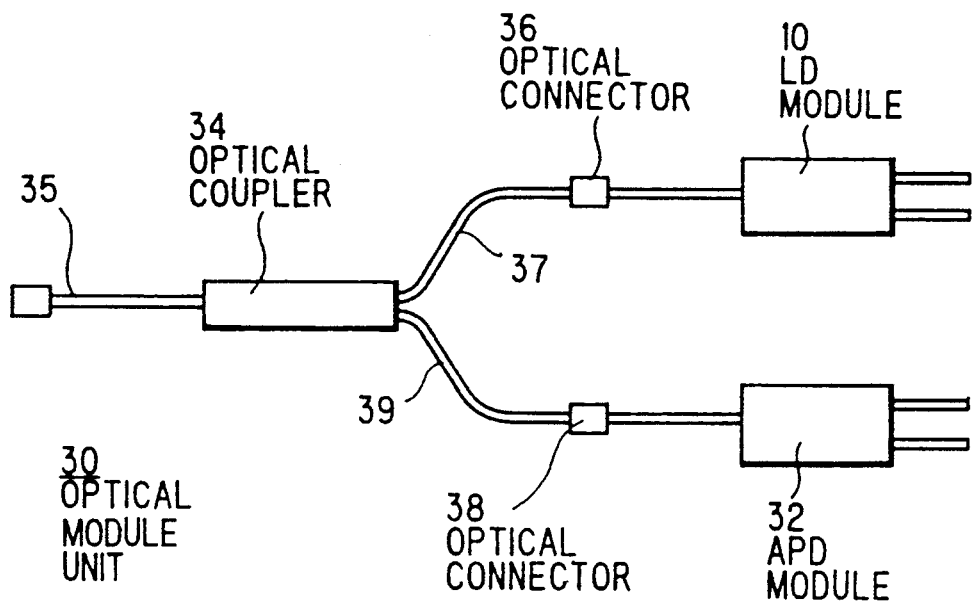
FIG.2 PRIOR ART

OPTICAL MODULE, METHOD FOR FABRICATING THE SAME AND OPTICAL MODULE UNIT WITH THE SAME

FIELD OF THE INVENTION

This invention relates to an optical module, a method for fabricating the same and an optical module unit with the same, and more particularly to, an optical module used in a private optical communication system such as LAN (local area network) and the like, a fabricating method for the same and an optical module unit with the same.

BACKGROUND OF THE INVENTION

Recently, the optical communication system has improved rapidly, so that communication speed has increased and a scale of the system has increased in size. An optical communication system has been used for a private communication such as LAN (local area network) and the like. Therefore, it is required that the system is fabricated to be low in cost and compact in size. In this situation, an optical module, for example an LD (laser diode) module and an APD (avalanche photodiode) module are important to meet the above requirements.

A first conventional optical module includes a module body, an optical device, a TEC (thermal expand core) fiber which is a part of a pigtail cord, and an aspherical lens for optically connecting the optical device and the TEC fiber. The TEC fiber is provided with a fiber end whose core diameter is expanded to face the aspherical lens. The fiber end is shaped to have an expanded diameter end by thermal treatment of about 1000° C. in an electric furnace.

The conventional optical module is described in a report of the autumn national convention C-193 1990 by Electronic Information Communication Society, entitled "Coupling characteristic between an optical fiber having an expanded diameter end and an LD (LASER DIODE)" by Mr. Kuniharu Kato, et al.

In fabrication of the conventional optical module, the aspherical lens is set in a body, and the optical device is fixed to be aligned to the body. After that, the TEC fiber is aligned to the optical axis and is fixed to the body.

According to the conventional optical module, a coupling tolerance of the TEC fiber is increased, because the TEC fiber has the expanded diameter core end. However, there are disadvantages in that the TEC fiber must have a length of ten to tens of centimeters in order to function as a pigtail cord. Therefore, the TEC fiber is difficult to be mass-produced by using an electric furnace, because a long optical fiber for the TEC fiber can not be put in the electric furnace of normal size. As the result, fabrication cost of the optical module becomes high. Further, the optical module cannot be fabricated efficiently, because the TEC fiber (pigtail cord) is cumbersome when the TEC fiber is aligned to the optical axis. The above described optical module is defined to be "a pigtail type". On the other hand, if the optical module is a receptacle type in which a receptacle is formed on the body, a sleeve connected to a ferrule is necessary to be fixed to the body, so that the optical module cannot be fabricated with low cost.

Further, an optical system having both functions of communication and broadcasting has been proposed. In such an optical system, two optical fiber lines for up-and-down transmission are installed between a subscriber and a station. On the other hand, there are two more economic methods, a bilateral transmitting method by using a common wavelength and a multi-transmitting method by using two kinds of lights having different wavelengths.

A conventional optical module unit includes an LD (laser diode) module of pigtail cord type or receptacle type, an APD (avalanche photodiode) module, an optical coupler for coupling the LD module and the APD module to a common optical fiber, and two optical connectors for connecting the LD module and the APD module to optical fibers connected to the optical coupler.

According to the conventional optical module unit, a bilateral communication can be carried out.

However, there is a disadvantage in that the size of the optical module unit is large and the cost is high, because the optical connectors are necessary to connect each module to the optical coupler.

SUMMARY OF THE INVENTION

Accordingly, it is an object of the invention to provide an optical module which can be fabricated efficiently.

It is a further object of the invention to provide a method for fabricating an optical module by which an optical module can be fabricated efficiently.

It is a still further object of the invention to provide an optical module unit which can be fabricated to be low in cost and compact in size.

According to the first feature of the invention, an optical module includes:

an optical device for emitting light or receiving light;

a first optical fiber whose core diameter at least an end portion facing the optical device is enlarged;

a second optical fiber having a uniform core diameter smaller than the core diameter of the first optical fiber;

a lens for optically connecting the optical device and the first optical fiber; and a capillary for connecting the first and second optical fibers at an intermediate position thereof.

According to the second feature of the invention, a method for fabricating an optical module includes the steps of:

setting an optical device and a lens to be optically connected in a body;

setting a first optical fiber, whose core diameter at an end portion facing the lens is enlarged, in a capillary;

aligning the first optical fiber optically to the optical device via the lens; and connecting a second optical fiber, having a uniform core diameter smaller than the core diameter of the first optical fiber, to the first optical fiber at an intermediate portion of the capillary.

According to the third feature of the invention, an optical module unit includes:

a module body;

a first optical device in the module body for emitting light;

a second optical device in the module body for receiving light;

two lenses each positioned to be optically aligned to the first and second optical devices, respectively;

two optical fibers of a first type in which a core diameter at end portions facing the first and second optical devices is enlarged, and light axes thereof are optically aligned to the first and second optical devices via the lenses, respectively;

two optical fibers of a second type having a uniform core diameter smaller than the diameter core of the first type optical fibers, respectively;

two capillaries where the first and second type optical fibers are connected at intermediate positions thereof, respectively; and an optical coupler for coupling the two optical fibers of the second type to be connected to an external optical fiber.

BRIEF DESCRIPTION OF THE DRAWINGS

The invention will be explained in more detail in conjunction with appended drawings wherein:

FIGS. 1 and 1A is a cross-sectional view showing a conventional optical module;

FIG. 2 is a schematic view showing a conventional optical module unit;

FIGS. 3 3A & 3B is a cross-sectional view showing an optical module of a preferred embodiment according to the invention;

DESCRIPTION OF THE PREFERRED EMBODIMENTS

Figure 3:
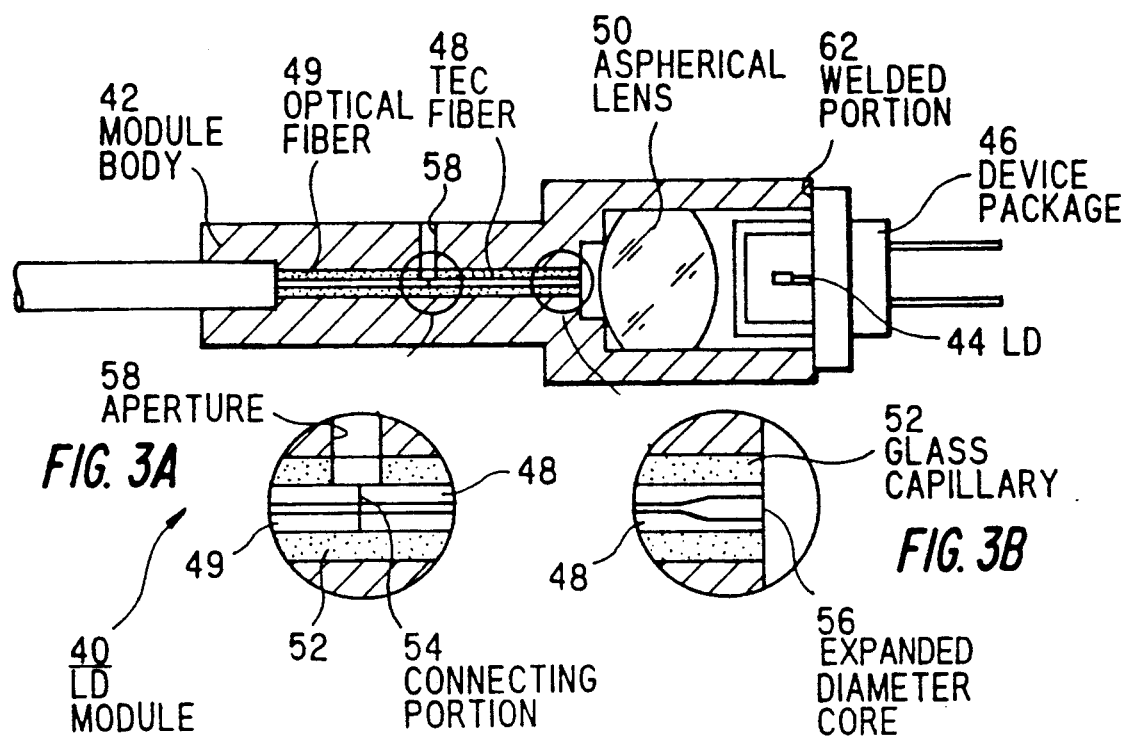

Before describing an optical module in a preferred embodiment according to the invention, the conventional optical module described before will be explained in conjunction with FIG. 1.

FIG. 1 shows a conventional LD (laser diode) module 10 which includes a module body 12, an LD 14 supported by a device package 16, a TEC (thermal expand core) fiber 18 which is a pigtail cord fixed to the module body 12 by an end fixture 20, and an aspherical lens 22 for optically connecting the LD 14 and the TEC fiber 18. The optical fiber 20 is provided with a fiber end 24, an expanded diameter core 26 at an end surface thereof facing the aspherical lens 22. The end surface of the TEC fiber 18 is grinded to be mirror state. In shaping the expanded diameter core 26 of the TEC fiber 18, carbon is applied on an end of a single mode optical fiber, and the end is heated by 1000° C., so that the expanded diameter core is formed.

In fabrication, the aspherical lens 22 is set in the module body 12, and the device package 16 with the LD 14 is aligned and fixed to the module body 12. After that, the TEC fiber 18 is aligned to the optical axis, and the TEC fiber 18 supported by the fixture 20 is fixed to the module body 12 by YAG welding. Thus, the LD module 10 is fabricated.

According to the conventional LD module 10, a coupling tolerance of the TEC fiber 18 is increased as composed to a commercially available optical module having a coupling tolerance of about ±0.5 μm, because the LD module 10 uses the TEC fiber 18 having the expanded diameter core 26. However, there are disadvantages in that the TEC fiber 18 must have a length of ten to tens centimeters, because the TEC fiber 18 functions as a pigtail cord. Therefore, the TEC fiber 18 is difficult to be mass-produced by using an electric furnace, because the long optical fiber can not be put in an electric furnace of normal size.

As the result, production cost of the LD module 10 becomes high. Further, the LD module 10 can not be fabricated efficiently, because the TEC fiber 18 having a long length is cumbersome when the TEC fiber 18 is aligned with the optical axis.

FIG. 2 shows a conventional optical module unit 30 which includes an LD (laser diode) module 10 explained before, an APD (avalanche photodiode) module 32, an optical coupler 34 of a fused type for coupling the LD module 30 and the APD module 32 to a common optical fiber 35, and optical connectors 36 and 38 for connecting the LD module 30 and APD module 32 to optical fibers 37 and 39 connected to the optical coupler 34.

According to the conventional optical module unit 30, a bilateral communication can be carried out. However, there is a disadvantage in that the size of the optical module unit 30 is large and the cost is high, because the optical connector 36 and 38 are necessary to connect each module 20 and 32 to the optical coupler 34.

Next, an optical module of a preferred embodiment according to the invention will be explained in conjunction with FIGS. 3 to 5.

FIG. 3 shows an LD (laser diode) module 40 of a preferred embodiment according to the invention. The LD module 40 includes a module body 42 shaped to be cylindrical made of stainless steel, an LD 44 supported by a device package 46, a TEC (thermal expand core) fiber 48, a normal optical fiber 49 which is for a pigtail cord, and an aspherical lens 50 for optically connecting the LD 44 and the TEC fiber 48.

The optical fibers 48 and 49 have an outer diameter of 125 μm, and are covered with a glass capillary 52 having an inner diameter of 126 μm. The optical fibers 48 and 49 are connected at a connecting portion 54 to each other. The TEC fiber 48 is shaped to have a length of about 3.4 to 10.0 mm, and is provided with an expanded diameter core 56 at an end surface thereof facing the aspherical lens 50. While, the optical fiber 49 of a core and a cladding of uniform diameters. The module body 42 is provided with an aperture 58 extending to the connecting portion 54.

In fabrication, the aspherical lens 50 is set in the module body 42. Next, after the end surface of the TEC fiber 48 is grinded to be mirror state, the TEC fiber 48 is inserted into the glass capillary 52 so that the expanded diameter core 56 faces the aspherical lens 50. Then, the device package 46 having the LD 44 is set to the module body 42, and aligned with the core of the TEC fiber 48. In the alignment of the LD 44, a near-field pattern at the end surface of the expanded diameter core 56 is observed from a pigtail cord side by a CCD camera, and distribution of light quantity of the observed pattern is determined. After that, the device package 46 is fixed to the module body 42 by YAG laser welding at a welded portion 62.

Next, the optical fiber 49 of a strand state is inserted into the glass capillary 52 with UV (ultra-violet)-setting binder so that a tip portion thereof is contacted to the end surface of the TEC fiber 48. After that, UV light is supplied to the connecting portion 54 from the aperture 58, so that the optical fibers 48 and 49 are connected by the UV-setting binder.

According to the preferred embodiment, a coupling tolerance between the aspherical lens 52 and the TEC fiber 48 is increased, because light passing through the aspherical lens 42 is supplied from the expanded diameter core 56 of the TEC fiber 48 in the same manner as in the conventional module 10. Further, the TEC fiber 48 can be designed shorter than the conventional one, so that the optical fiber can be mass-produced easily by using an electric furnace.

In addition, a coupling efficiency of the LD module 40 is approximately equal to a module using a single continuous optical fiber. That is, an output level of the LD 44 is "2.5 dBm", an output level of the light supplied from the pigtail cord 49 is "0 dBm", so that the coupling efficiency is "2.5 dB".

In the preferred embodiment, the optical fibers 48 and 49 may be supported by a capillary made of ceramic instead of glass. Further, a convergence rod lens or a spherical lens may be used instead of the aspherical lens 52.

Figure 4:
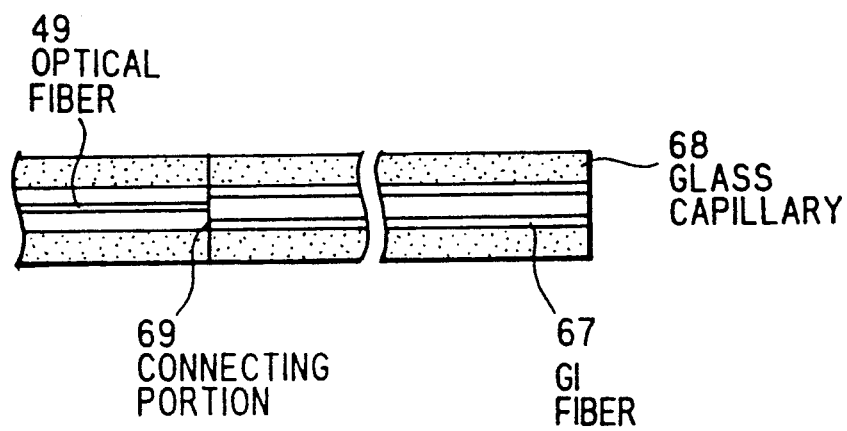
FIG. 4 is a cross-sectional view showing a part of an optical module modified in the preferred embodiment.
Figure 5:
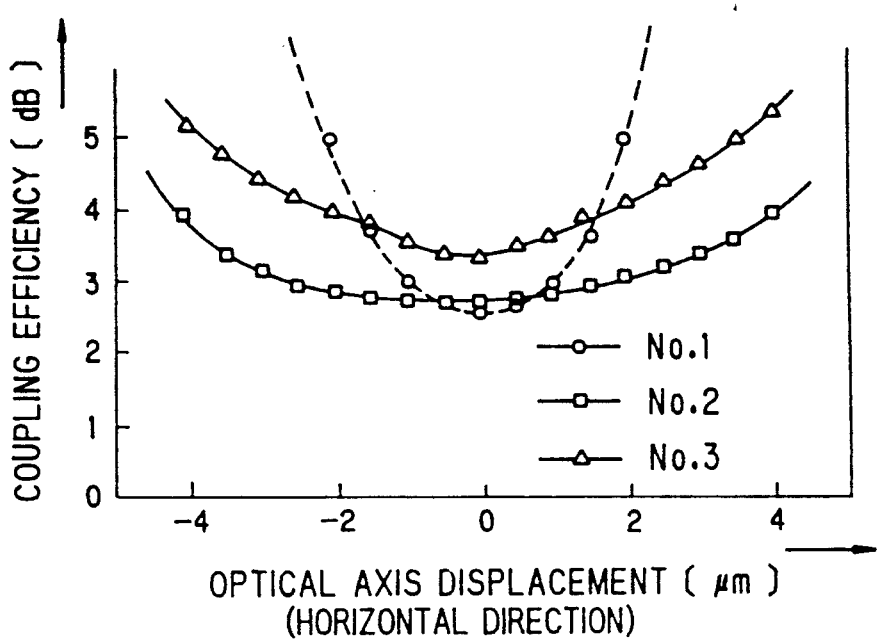
FIG. 5 is a graph showing operation of the preferred embodiment.

FIG. 4 shows an optical fiber structure of a modified embodiment using a GI (graded index) fiber 67 having a large diameter core instead of the TEC fiber 48. The GI fiber 67 is connected to an optical fiber 49 having a smaller diameter core at a connecting portion 69 by UV-setting binder and the like. The optical fibers 49 and 67 are inserted in a glass capillary 68.

According to the optical fiber structure, coupling loss at the connecting portion is sufficiently small, because light transmitted through the optical fiber 67 is all supplied to the center thereof at the connecting portion 69. FIG. 5 shows coupling efficiency between an LD and an optical fiber in an optical module. In this graph, No.1 shows a housing that two optical fibers having the same inner diameter are connected, No.2 shows a housing that the optical fibers 49 and 48 shown in FIG. 3 are used, and No.3 shows a housing that the optical fibers 49 and 67 shown in FIG. 4 are used, respectively. It can be seen in FIG. 5 that No. 1 structure is determined in coupling efficiency, as the amount of the optical axial displacement is increased in the horizontal direction, while the Nos. 2 and 3 structures suppress the deterioration of the coupling efficiency as compared to No. 1 structure, even if the optical oxial displacement is increased.

Figure 6:
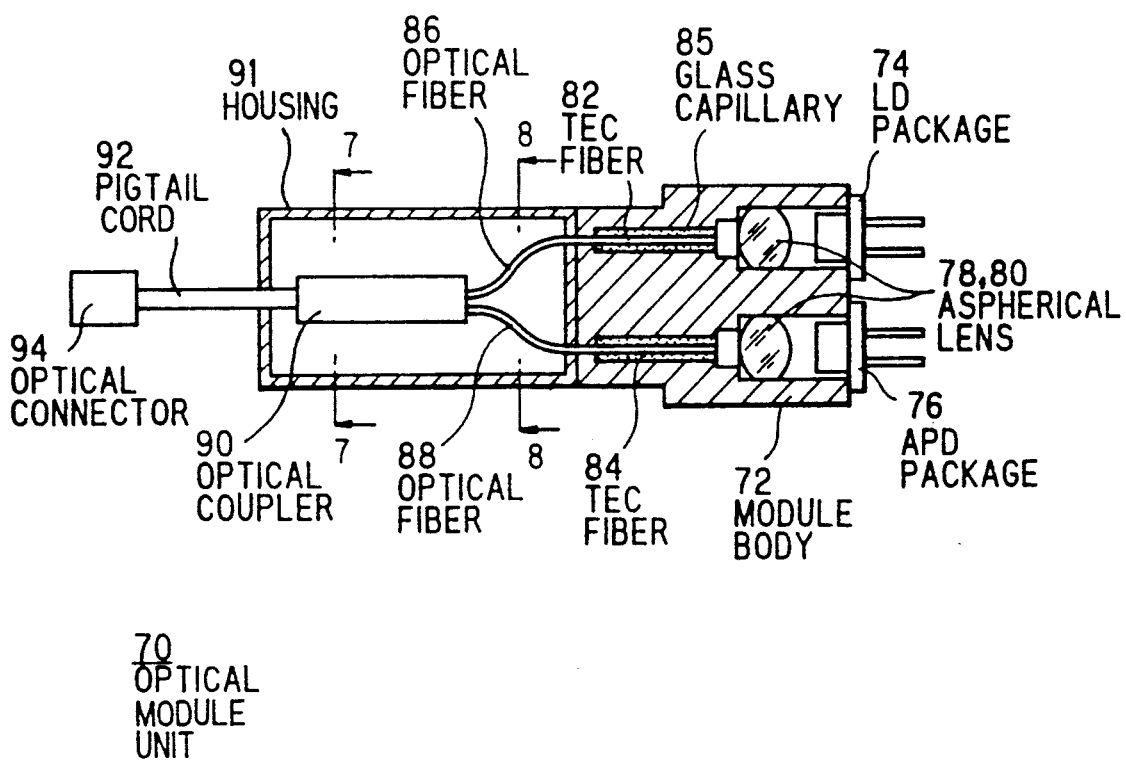
FIG. 6 is a cross-sectional view showing an optical module unit of a preferred embodiment according to the invention.
Figure 7:
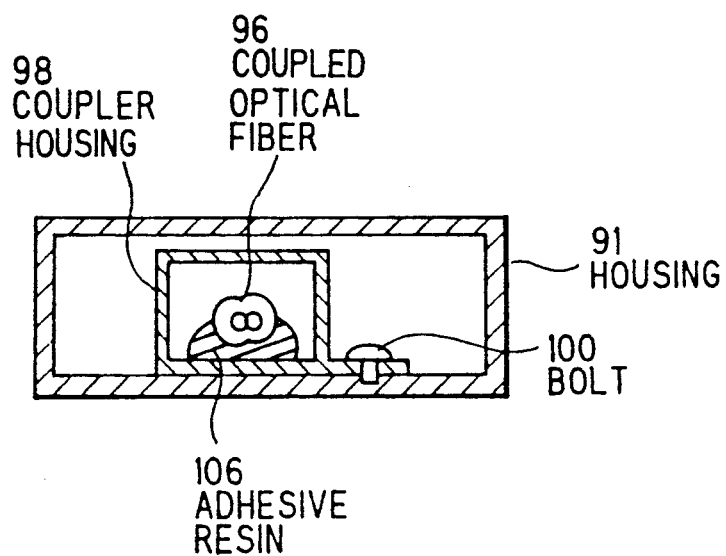
FIG. 7 is a cross-sectional view on line A—A in FIG. 6.
Figure 8:
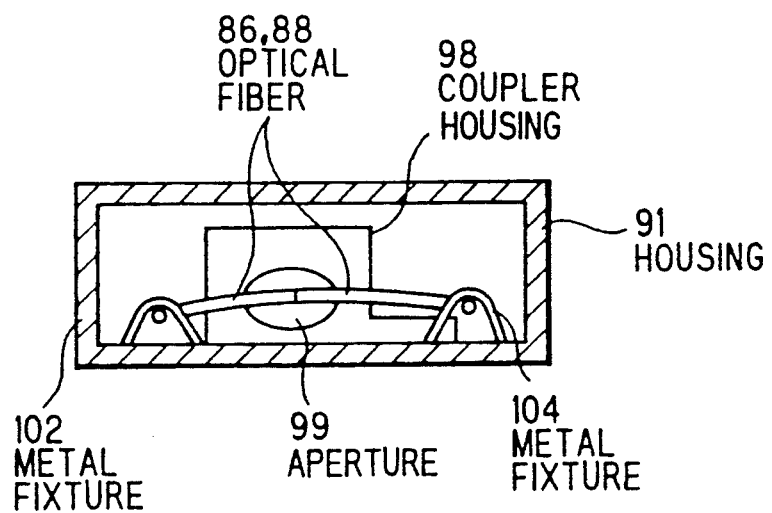
FIG. 8 is a cross-sectional view on line B—B in FIG. 6.

FIGS. 6 to 8 show an optical module unit 70 of a preferred embodiment according to the invention, using the above preferred optical module embodiment shown in FIG. 3. That is, the optical module unit 70 includes a module body 72, an LD package 74, an APD package 76, aspherical lenses 78 and 80 positioned in the module body 72, TEC fibers 82 and 84 inserted in glass capillary 85, optical fibers 86 and 88 connected to the TEC fibers 82 and 84, an optical coupler 90 of a fused type for coupling the optical fibers 86 and 88, a housing 91 in which the optical coupler 90 is positioned, a pigtail cord 92 connected to the optical coupler 90, and an optical connector 94 connected to the pigtail cord 92. The LD package 74 and the APD package 76 are fixed to the module body 72 by YAG welding.

Figure 9:
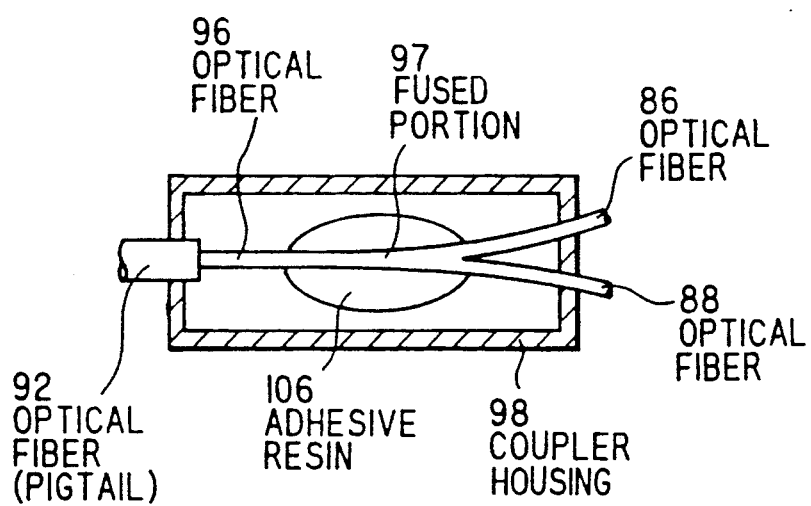
FIG. 9 is a cross-sectional view showing a structure of a coupler housing shown in FIG. 6.

In the housing 91, the optical fibers 86 and 88 are inserted through an operture 99 into a coupler housing 98 and coupled at a fused portion 97 as shown in FIGS. 7 to 9. The coupler housing 98 is fixed in the housing 91 by a bolt 100. The optical fibers 86 and 88 are supported by metal fixtures 102 and 104, respectively, and are adhered to the bottom of the coupler housing 98 by adhesive resin 106.

In fabrication, the LD and APD module portion is fabricated in the same manner as in the preferred embodiment shown in FIG. 3. On the other hand, the optical fibers 86 and 88 are connected in the optical coupler 90. Next, the optical fibers 86 and 88 are inserted into the glass capillary 85 so that a tip portion thereof are contacted to the end surfaces of the TEC fibers 82 and 84. Then, the optical fibers 86 and 88 and the TEC fibers 82 and 84 are connected by the UV-setting binder method. After that, the housing 91 is fixed to the module body 72 by welding or using adhesive. In this optical module unit, the optical connector 94 terminating the pigtail cord optical fiber 92 may be connected to an optical connector to be connected an optical fiber transmission line.

According to the preferred embodiment, the optical module unit 70 can be fabricated easily and compactly. In the preferred embodiment, GI (graded index) fibers may be used instead of the TEC fibers 82 and 84.

Although the invention has been described with respect to specific embodiment for complete and clear disclosure, the appended claims are not to thus limited and alternative constructions that may occur to one skilled in the art which fairly fall within the basic teaching herein set forth.

What is claimed is:
1. An optical module, comprising:
   a module body having a first end and a second end communicated by a through-aperture;
   a capillary provided in a half portion of said through-aperture adjacent to said first end of said module body;
   a lens provided at a predetermined position in a remaining half portion of said through-aperture adjacent to said second end of said module body;
   a first optical fiber provided in a half portion of said capillary, said first optical fiber having an expanded core at least at one end facing said lens;
   an optical device for light emission or light receipt, said optical device being fixed to said second end of said module body following a light axis alignment in regard to said first optical fiber via said lens; and
   a second optical fiber provided in a remaining half portion of said capillary, said second optical fiber being inserted into said remaining half portion of said capillary following said light axis alignment to be connected to said first optical fiber.

2. An optical module, according to claim 1, wherein:
said first optical fiber is a TEC (thermal expand core, in which the core diameter is expanded by an application of heat) fiber having an end portion whose core diameter is larger than that of the other portion thereof, said end portion being on a side of said optical device.

3. A optical module, according to claim 1, wherein:
said first optical fiber is a GI (grated-index) fiber having a uniform diameter larger than that of said second optical fiber.

4. A optical module, according to claim 1, wherein:
said capillary is provided at said intermediate portion with an aperture; and
said first and second optical fibers are connected by UV (ultra violet)-setting binder.
said UV-setting binder being hardened by receiving UV light radiated through said aperture.

5. A method for fabricating an optical module, comprising the steps of:
   setting a lens in a body;
   setting a first optical fiber, whose core diameter at an end portion facing said lens is enlarged, in a capillary;
   setting an optical device in said body so that said optical device is optically aligned to said first optical fiber via said lens; and
   connecting a second optical fiber, having a uniform core diameter smaller than said core diameter of said first optical fiber, to said first optical fiber at an intermediate portion of said capillary.

6. A method for fabricating an optical module, according to claim 5, wherein:
   said step of connecting said second optical fiber includes inserting said second optical fiber with UV-setting binder at a connecting portion with said first optical fiber, and supplying UV (ultra violet) light through an aperture of said capillary to said connecting portion.

7. An optical module unit, comprising:
   a module body;
   a first optical device in said module body for emitting light;
   a second optical device in said module body for receiving light;
   two lenses each positioned to be optically aligned to said first and second optical devices, respectively;
   two optical fibers of a fist type in which a core diameter at end portions facing said first and second optical devices is enlarged, and light axes thereof are optically aligned to said first and second optical devices via said lenses, respectively;
   two optical fibers of a second type having a uniform core diameter smaller than said diameter core of said first type optical fibers, respectively;
   two capillaries where said first and second type optical fibers are connected at intermediate positions thereof, respectively; and
   an optical coupler for coupling said two optical fibers of said second type to be connected to an external optical fiber.

8. An optical module unit, according to claim 7, wherein:
   said two optical fibers of said first type are TEC (thermal expand core) fibers each having an end portion whose core diameter is larger than that of the other portion thereof, respectively.

9. An optical module unit, according to claim 7, wherein:
   said two optical fibers of said first type are GI (grated-index) fibers each having a uniform diameter larger than that of said second optical fibers, respectively.

10. A optical module unit, according to claim 7, wherein:
   said first type optical fibers and said second type optical fibers are connected by UV (ultra violet)-setting binder, said UV-setting binder being hardned by receiving UV-light supplied through apertures of said two capillaries.

* * * * *